Figure 1:
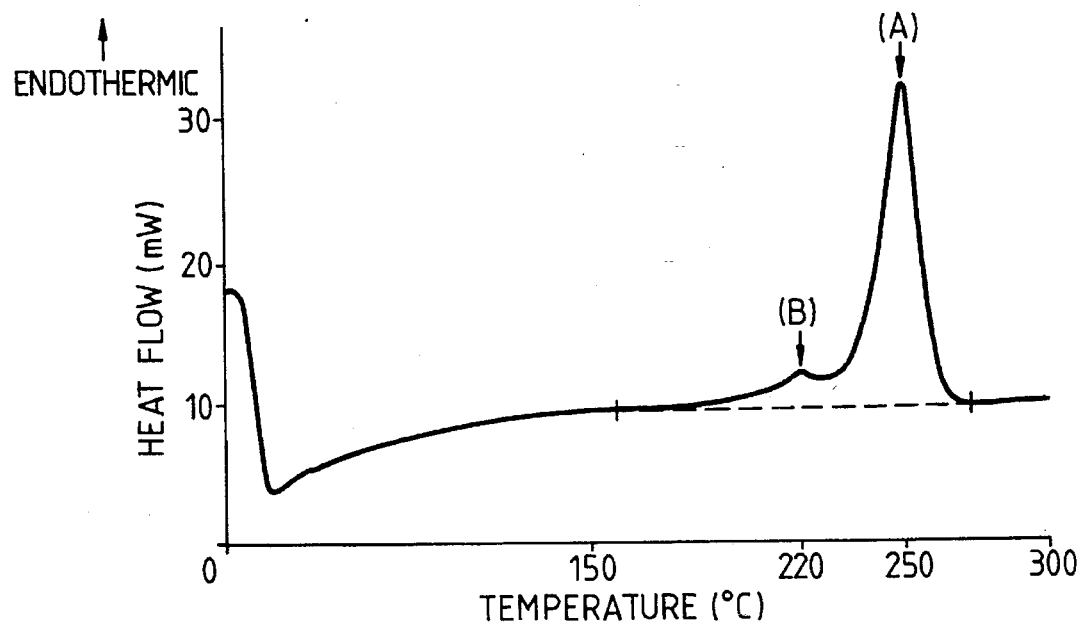

United States Patent [19]

Mortlock et al.

[11] Patent Number: 5,562,984
[45] Date of Patent: Oct. 8, 1996

[54] POLYESTER FILM

[75] Inventors: Simon V. Mortlock, Guisborough; Barry J. Lewis, Middlesbrough, both of United Kingdom

[73] Assignee: Imperial Chemical Industries PLC, London, England

[21] Appl. No.: 219,898

[22] Filed: Mar. 30, 1994

[30] Foreign Application Priority Data

Apr. 2, 1993 [GB] United Kingdom ............ 9307002

[51] Int. Cl.$^6$ .................................................. D02G 3/00
[52] U.S. Cl. ................ 428/364; 525/437; 524/222; 524/323; 524/375; 524/413; 428/402; 264/210.1; 264/291
[58] Field of Search ............ 525/437; 524/222, 524/323, 375, 413; 428/364, 402; 264/210.1, 291

[56] References Cited

U.S. PATENT DOCUMENTS 5,124,388  6/1992  Pruett et al. .................. 524/343

FOREIGN PATENT DOCUMENTS

| 238140 | 9/1987 | European Pat. Off. . |
| 501545 | 9/1992 | European Pat. Off. . |
| 2298546 | 12/1990 | Japan . |
| 838708 | 6/1960 | United Kingdom . |

OTHER PUBLICATIONS

Japanese Abstract Publication No. JP 04316829/A dated Nov. 9, 1992.
Research Disclosure 14434 (Apr. 1976).
WO 92/13021 (Aug. 1992).

*Primary Examiner*—Samuel A. Acquah
*Attorney, Agent, or Firm*—Cushman Darby & Cushman

[57] ABSTRACT

A polyester film contains a polyester having an intrinsic viscosity (IV) in the range from 0.65 to 0.8 and an antioxidant. The polyester has an endothermic high temperature peak at a temperature of (A)°C. and an endothermic low temperature peak at a temperature of (B)°C., both peaks being measured by differential scanning calorimetry (DSC), and the value of (A–B) is in the range from 25° C. to 50° C. The polyester film is suitable for use an insulation film, exhibiting improved ageing properties.

11 Claims, 1 Drawing Sheet

POLYESTER FILM

This invention relates to a polyester film, and in particular to a film for use as an electrical insulator.

Polyester films, particularly polyethylene terephthalate, have been used in industrial applications such as electrical applications, where the films operate as insulator materials, e.g. in electric motors and electric capacitors. In such electrical applications, the polyester films are subject to relatively high temperatures for long periods of time. Unfortunately, commercially available polyester films are susceptible to thermal ageing which can result in an unacceptable reduction in the efficiency of the films as electrical insulators. Thus, there is a commercial need for polyester films exhibiting improved thermal ageing characteristics.

However, improvements in thermal ageing can result in polyester films displaying an increased tendency to delaminate in-plane, when used as electrical insulators. Ideally, polyester films possessing improved thermal ageing, which are not susceptible to in-plane delamination are required.

Polyester films are known to contain relatively small amounts of low molecular weight materials, or oligomers. The oligomers are extracted from the polyester film, for example when used to insulate sealed motors, and can cause problems by being deposited elsewhere in the system.

We have now devised a polyester film which reduces or substantially overcomes one or more of the aforementioned problems.

Accordingly, the present invention provides a polyester film comprising a polyester having an intrinsic viscosity (IV) in the range from 0.65 to 0.8, and an effective amount of an antioxidant, the polyester having an endothermic high temperature peak at a temperature of (A)°C. and an endothermic low temperature peak at a temperature of (B)°C., both peaks being measured by differential scanning calorimetry (DSC), wherein the value of (A–B) is in the range from 25° C. to 50° C.

The invention further provides a method of producing a polyester film comprising a polyester having an intrinsic viscosity (IV) in the range from 0.65 to 0.8, and an effective amount of an antioxidant, the polyester having an endothermic high temperature peak at a temperature of (A)°C. and an endothermic low temperature peak at a temperature of (B)°C., both peaks being measured by differential scanning calorimetry (DSC), wherein the value of (A–B) is in the range from 25° C. to 50° C.

The polyester film is suitably formed from any synthetic thermoplastic polyester, particularly a synthetic linear polyester which my be obtained by condensing one or more dicarboxylic acids or their lower alkyl (up to 6 carbon atoms) diesters, e.g. terephthalic acid, isophthalic acid, phthalic acid, 2,5- 2,6- or 2,7-naphthalenedicarboxylic acid, succinic acid, sebacic acid, adipic acid, azelaic acid, 4,4'-diphenyldicarboxylic acid, hexahydroterephthalic acid or 1,2-bis-p-carboxyphenoxyethane (optionally with a monocarboxylic acid, such as pivalic acid) with one or more glycols, particularly aliphatic glycols, e.g. ethylene glycol, 1,3-propanediol, 1,4-butanediol, neopentyl glycol and 1,4-cyclohexanedimethanol. A polyethylene terephthalate or polyethylene naphthalate film is preferred. A polyethylene terephthalate film is particularly preferred, especially such a film which has been biaxially oriented by sequential stretching in two mutually perpendicular directions, typically at a temperature in the range 70° to 125° C., and preferably heat set, for example, as described in British patent 838,708.

Copolymers containing mainly polyethylene terephthalate, with minor amounts of units derived from other glycols or diacids are also preferred. For example, in a particularly preferred embodiment of the invention the polyester film is formed from a polyethylene terephthalate copolymer comprising up to 5 mole %, more preferably up to 3 mole % of isophthalate units.

Polyesters described herein can be synthesised by conventional methods. A typical process involves a direct esterification or ester exchange reaction, followed by polycondensation. It is preferred that polycondensation includes a solid phase polymerisation stage. The solid phase polymerisation may be carried out on a fluidised bed, e.g. fluidised with nitrogen, or on a vacuum fluidised bed, using a rotary vacuum drier.

A polyester film according to the invention my be unoriented, or uniaxially oriented, but is preferably biaxially oriented by drawing in two mutually perpendicular directions in the plane of the film to achieve a satisfactory combination of mechanical and physical properties. Simultaneous biaxial orientation my be effected by extruding a polyester tube which is subsequently quenched, reheated and then expanded by internal gas pressure to induce transverse orientation, and withdrawn at a rate which will induce longitudinal orientation. Sequential stretching may be effected in a stenter process by extruding the polyester material as a flat extrudate which is subsequently stretched first in one direction and then in the other mutually perpendicular direction. Generally, it is preferred to stretch firstly in the longitudinal direction, ie the forward direction through the film stretching machine, and then in the transverse direction. A stretched polyester, particularly polyethylene terephthalate, film may be, and preferably is, dimensionally stabilised by heat-setting under dimensional restraint at a temperature above the glass transition temperature thereof, preferably in the range from 200° C. to 225° C.

A range of antioxidants may be used, such as antioxidants which work by trapping radicals or by decomposing peroxide. Suitable "radical trapping" antioxidants include hindered phenols, secondary aromatic amines and hindered amines, e.g. "Tinuvin 770" (obtained from Ciba-Geigy). Preferred "peroxide decomposing" antioxidants are trivalent phosphorous compounds, e.g. phosphonites, phosphites, such as triphenyl phosphite, trialkylphosphites; and thiosynergists, e.g. esters of thiodipropionic acid such as dilauryl thiodipropionate. Hindered phenol antioxidants are preferred, a particularly preferred hindered phenol is tetrakis-(methylene 3-(4'-hydroxy-3', 5'-di-t-butylphenyl propionate) methane, which is commercially available as "Irganox 1010" (obtained from Ciba-Geigy). Other suitable commercially available hindered phenols include "Irganox 1035, 1076, 1098 and 1330" (obtained from Ciba-Geigy), "Santanox R" (obtained from Monsanto), "Cyanox" antioxidants (obtained from American Cyanamid) and "Good-rite" antioxidants (obtained from BF Goodrich).

The concentration of antioxidant present in the polyester film is preferably in the range from 50 ppm to 5000 ppm, more preferably in the range from 300 ppm to 1500 ppm, particularly in the range from 400 ppm to 1200 ppm, and especially in the range from 450 ppm to 600 ppm. A mixture of more than one antioxidant may be used, in which case the total concentration thereof is preferably within the aforementioned ranges.

Incorporation of the antioxidant into the polyester may be effected by conventional techniques—preferably, by mixing with the monomeric reactants from which the polyester is derived, particularly at the end of the direct esterification or ester exchange reaction, prior to polycondensation.

Antioxidants have been previously added to polyester films for the purpose of reducing colour formation. The advantage conferred by including an antioxidant, preferably in the concentration ranges disclosed herein, in a polyester film according to the invention, is that a surprising improvement in thermal ageing characteristics is obtained.

The polyester film preferably has an (A–B) value in the range from 27° C. to 45° C., more preferably in the range from 28° C. to 40° C., and especially in the range from 30° C. to 35° C. whereby (A) is the temperature in °C. of the endothermic high temperature peak and (B) is the temperature in °C. of the endothermic low temperature peak, both peaks being measured by differential scanning calorimetry (DSC), as described herein. The advantage of exhibiting (A–B) values within the ranges disclosed herein, in a polyester film according to the invention, is that a surprising improvement in thermal ageing characteristics is obtained without detrimentally effecting the in-plane delamination properties of the film.

The polyester of the polyester film according to the invention preferably has an intrinsic viscosity (IV) in the range from 0.67 to 0.75, more preferably in the range from 0.68 to 0.72.

In a preferred embodiment of the invention, the polyester film has an oligomer content of not more than 0.8%, more preferably not more than 0.7%, particularly not more than 0.6%, and especially not more than 0.55% by weight of the film.

The polymeric film according to the invention is preferably translucent, preferably exhibiting a Transmission Optical Density (Sakura Densitometer; type PDA 65; transmission mode) of from 0.1 to 0.5, more preferably of from 0.15 to 0.35.

The polymeric film is conveniently rendered opaque by incorporating an opacifying agent therein, such as a particulate inorganic filler. Suitable "opacifying" particulate inorganic fillers include conventional inorganic pigments and fillers, and particularly metal or metalloid oxides, such as alumina, titania and alkaline metal salts, such as the carbonates and sulphates of calcium and barium.

The opacifying inorganic fillers may be of the voiding and/or non-voiding type. Suitable inorganic fillers may be homogeneous and consist essentially of a single filler material or compound, such as titanium dioxide or barium sulphate alone. Alternatively, at least a proportion of the filler may be heterogeneous, the primary filler material being associated with an additional modifying component. For example, the primary filler particle may be treated with a surface modifier, such as a pigment, soap, surfactant coupling agent or other modifier to promote or alter the degree to which the filler is compatible with the substrate polymer.

Titanium dioxide is a particularly preferred opacifying inorganic filler.

The opacifying filler, particularly of titanium dioxide, should be finely-divided, and the average particle size thereof is desirably from 0.01 to 10 μm. Preferably, the opacifying filler has an average particle size of from 0.05 to 5 μm, more preferably of from 0.1 to 1 μm, and particularly of from 0.15 to 0.3 μm.

The amount of opacifying filler, particularly of titanium dioxide, incorporated into the substrate preferably should be in the range from 0.05% to 2%, more preferably in the range from 0.1% to 1%, and especially in the range from 0.2% to 0.4%.

In addition to the opacifying inorganic filler, the polymeric film according to the invention my comprise a particulate inorganic filler which primarily endows handling properties on the film. The "handling" inorganic filler may be selected from silica, silicates, ground glass, chalk, talc, china clay, magnesium carbonate, zinc oxide, zirconia or calcium carbonate. Silica is a preferred handling filler, preferably present in the range from 0.05% to 2%, more preferably in the range from 0.1% to 1%, and especially in the range from 0.2% to 0.4%.

The handling filler preferably has an average particle size of from 0.1 to 10 μm, more preferably of from 1 to 8 μm, and particularly of from 3 to 5 μm.

Particle sizes may be measured by electron microscope, coulter counter or sedimentation analysis and the average particle size may be determined by plotting a cumulative distribution curve representing the percentage of particles below chosen particle sizes.

It is preferred that none of the filler particles incorporated into the polyester film according to this invention should have an actual particle size exceeding 30 μm. Particles exceeding such a size my be removed by sieving processes which are known in the art. However, sieving operations are not always totally successful in eliminating all particles greater than a chosen size. In practice, therefore, the size of 99.9% by number of the particles should not exceed 30 μm. Most preferably the size of 99.9% of the particles should not exceed 20 μm.

Incorporation of the filler(s) into the polyester may be effected by conventional techniques—for example, by mixing with the monomeric reactants from which the polyester is derived, or by dry blending with the polyester in granular or chip form prior to formation of a film therefrom.

Thickness of the polyester film may vary depending on the envisaged application but, in general, will not exceed 500 μm, will preferably be in a range from 50 to 400 μm, and more preferably be in a range from 125 to 350 μm.

The following test procedures were used.

Thermal ageing: Accelerated thermal ageing was performed at 180° C. in a circulating air oven. The half-life, in days, of the percentage elongation to break (ETB) of the film was determined. ASTM D882-83 was used for mechanical testing to determine the % ETB values. Polyester films according to the invention preferably have a half life Z ETB of greater than 8 days, more preferably greater than 10 days at 180° C.

Intrinsic viscosity (IV): Measured by solution viscometry, by using a 1% by weight solution of polyester in o-chlorophenol at 25° C.

DSC scan: Differential scanning calorimeter (DSC) scans were obtained using a Perkin Elmer DSC 7 instrument. Individual layers of polyester film weighing 5 mg were encapsulated into a standard Perkin Elmer aluminium DSC crucible. The film and crucible were pressed flat to ensure that the film was partially constrained in order to minimise effects of relaxation of orientation during heating. The specimen was placed in the sample holder of the instrument and heated at 80° C. per minute from 30° C. to 300° C. to record the relevant trace. A dry, inert purge gas, e.g. nitrogen, argon, was used. The temperature and heat flow axis of the DSC instrument were fully calibrated for the experimental conditions, ie for the heating rate and gas flow rate. The values for the peak temperatures, ie the endothermic high temperature peak (A) and endothermic low temperature peak (B), were taken as the maximum displacement above a baseline drawn from the onset of each endothermic melting process to the end of each endothermic melting process. Peak temperature measurements were derived using standard analysis procedures within the Perkin Elmer software. Precision and accuracy of the measurements was ±2° C.

Delamination: This was determined by mechanically punching, using a compressed air driven punch, samples of film through a die. The formed specimens (12.5 mm×8 cm) were then examined under a suitable light source for signs of delamination along the specimen folds, and the percentage of specimens showing evidence of delamination was calculated (from a total number of 25 specimens).

Oligomer Concentration: Measured by using a solvent extraction method. A sample of film was placed in a soxhlet extraction thimble, and extracted with refluxing xylene for 24 hours. The film sample was removed, the xylene solution was evaporated to dryness and the total amount of oligomer extracted was calculated, being expressed as a percentage of the initial film sample weight.

The invention is illustrated by reference to the accompanying drawing in which:

FIG. 1 is a typical DSC scan (heat flow versus temperature) obtained for a polyester film according to the invention.

Referring to FIG. 1, the peak marked (A) is the endothermic high temperature peak having a value of 250° C., and the peak marked (B) is the endothermic low temperature peak having a value of 220° C. (A–B)=(250–220)°C. 30°0 C.

The invention is further illustrated by reference to the following Examples.

EXAMPLE 1

Terephthalic acid was reacted with ethylene glycol to form bis-(2-hydroxyethyl) terephthalate and low oligomers thereof, in a standard direct esterification reaction. At the end of the direct esterification reaction 400 ppm of phosphoric acid stabiliser was added, followed by 500 ppm of antimony trioxide polycondensation catalyst and 500 ppm of "Irganox 1010" antioxidant. 0.3% of silica of particle size 4 μm, and 0.3% of titanium dioxide of particle size 0.2 μm were also added at this stage. A standard batch polycondensation reaction was performed until the intrinsic viscosity of the resultant polyethylene terephthalate was approximately 0.52. The polyethylene terephthalate was further polymerised by means of a batch solid phase polymerisation process, until the intrinsic viscosity (IV) of the polyethylene terephthalate was approximately 0.7 to 0.75. The solid phase polymerisation process utilised a fluidised bed, fluidised with nitrogen.

The above produced polyethylene terephthalate polymer was used to make a polymeric film. The film was melt extruded, cast onto a cooled rotating drum and stretched at a temperature of about 90° C. in the direction of extrusion to approximately 3 times its original dimensions. The film was passed into a stenter oven, where the film was stretched at a temperature of about 120°C. in the sideways direction to approximately 3 times its original dimensions. The biaxially stretched film was heat set at a temperature of about 215° C. under dimensional restraint. Final film thickness was 190 μm.

The polyester film was subjected to the test procedures described herein. The results are given in Table 1.

EXAMPLE 2

This is a comparative example not according to the invention. The procedures in Example 1 were repeated except that no "Irganox 1010" was added to the reaction mixture.

The polyester film was subjected to the test procedures described herein. The results are given in Table 1.

EXAMPLE 3

This is a comparative example not according to the invention. The procedures in Example 1 were repeated except that no "Irganox 1010" was added to the reaction mixture and the polyester film was heat set at a temperature of about 230° C., and the final film thickness was 250 μm.

The polyester film was subjected to the test procedures described herein. The results are given in Table 1.

EXAMPLE 4

This is a comparative example not according to the invention. The procedures in Example 1 were repeated except that no "Irganox 1010" was added to the reaction mixture and the polyester film was heat set at a temperature of about 226° C. In addition, a solid phase polymerisation stage was not used. Instead, the standard batch polycondensation reaction was continued for a longer period of time, until the IV of the polyester was approximately0.7 to 0.75. Final film thickness was 350 μm.

The polyester film was subjected to the test procedures described herein. The results are given in Table 1.

EXAMPLE 5

This is a comparative example not according to the invention. The procedures in Example 1 were repeated except that 1000 ppm "Irganox 1010" was added to the reaction mixture and the polyester film was heat set at a temperature of about 220° C. In addition, a solid phase polymerisation stage was not used. Instead, the standard batch polycondensation reaction was continued for a longer period of time, until the IV of the polyester was approximately 0.7 to 0.75. The final film thickness was 125 μm.

The polyester film was subjected to the test procedures described herein. The results are given in Table 1.

EXAMPLE 6

The procedures in Example 5 were repeated except that the reaction mixture comprised 2 mole % of isophthalic acid.

The polyester film was subjected to the test procedures described herein. The results are given in Table 1.

EXAMPLE 7

The procedures in Example 1 were repeated except that the solid phase polymerisation process utilised a rotary vacuum polymerisation apparatus and the polyester film was heat set at a temperature of about 222° C. Final film thickness was 250 μm.

The polyester film was subjected to the test procedures described herein. The results are given in Table 2.

EXAMPLE 8

This is a comparative example not according to the invention. The procedures in Example 7 were repeated except that the polyester film was heat set at a temperature of about 192° C.

The polyester film was subjected to the test procedures described herein. The results are given in Table 2.

EXAMPLE 9

This is a comparative example not according to the invention. The procedures in Example 7 were repeated except that the polyester film was heat set at a temperature of about 228° C.

The polyester film was subjected to the test procedures described herein. The results are given in Table 2.

EXAMPLE 10

The procedures in Example 7 were repeated except that the reaction mixture comprised 2 mole % of isophthalic acid and the polyester film was heat set at a temperature of about 220° C.

The polyester film was subjected to the test procedures described herein. The results are given in Table 2.

EXAMPLE 11

This is a comparative example not according to the invention. The procedures in Example 10 were repeated except that the polyester film was heat set at a temperature of about 192° C.

The polyester film was subjected to the test procedures described herein. The results are given in Table 2.

EXAMPLE 12

This is a comparative example not according to the invention. The procedures in Example 10 were repeated except that the polyester film was heat set at a temperature of about 236° C.

The polyester film was subjected to the test procedures described herein. The results are given in Table 2.

The above experiments illustrate the improved properties of polyester films according to the present invention.

TABLE 1

| Example No | Antioxidant Concentration (ppm) | Isophthalic Acid Concentration (mol %) | Intrinsic Viscosity (IV) of Film Polymer | *DSC Scan (A–B) (°C.) | Thermal Ageing (half life of % ETB in days) | Oligomer Concentration (% by weight) |
|---|---|---|---|---|---|---|
| 1 | 500 | 0 | 0.68 | 35 | 12 | 0.55 |
| 2 (Comparative) | 0 | 0 | 0.63 | 35 | 5 | 0.65 |
| 3 (Comparative) | 0 | 0 | 0.68 | 20 | 5 | 0.6 |
| 4 (Comparative) | 0 | 0 | 0.64 | 24 | 4 | 1.55 |
| 5 (Comparative) | 1000 | 0 | 0.63 | 30 | 7 | 1.6 |
| 6 | 1000 | 2 | 0.67 | 27 | 11 | 1.5 |

Temperature of the endothermic high temp. peak minus the temperature of the endothermic low temp. peak.

TABLE 2

| Example No | Antioxidant Concentration (ppm) | Isophthalic Acid Concentration (mol %) | Intrinsic Viscosity (IV) of Film Polymer | *DSC Scan (A–B) (°C.) | Thermal Ageing (half life of % ETB in days) | Oligomer Concentration (% by weight) | Delamination (%) |
|---|---|---|---|---|---|---|---|
| 7 | 500 | 0 | 0.68 | 28 | 12 | 0.58 | 0 |
| 8 (Comparative) | 500 | 0 | 0.69 | 58 | 14 | 0.42 | 100 |
| 9 (Comparative) | 500 | 0 | 0.65 | 22 | 8 | 0.68 | 0 |
| 10 | 500 | 2 | 0.69 | 27 | 12 | 0.61 | 0 |
| 11 (Comparative) | 500 | 2 | 0.71 | 55 | 17 | 0.54 | 100 |
| 12 (Comparative) | 500 | 2 | 0.68 | 11 | 4 | 0.73 | 0 |

*Temperature of the endothermic high temp. peak minus the temperature of the endothermic low temp. peak.

We claim:

1. An oriented polyester film resistant to delamination comprising a polyester having an intrinsic viscosity (IV) in the range from 0.65 to 0.8, and an effective amount of an antioxidant, the polyester having an endothermic high temperature peak at a temperature of (A)°C. and an endothermic low temperature peak at a temperature of (B)°C., both peaks being measured by differential scanning calorimetry (DSC), wherein the value of (A–B) is in the range from 25° C. to 50° C.

2. A polyester film according to claim 1 wherein the concentration of antioxidant is in the range from 50 ppm to 5000 ppm.

3. A polyester film according to claim 1 wherein the intrinsic viscosity of the polyester is in the range from 0.67 to 0.75.

4. A polyester film according to claim 1 wherein the value of (A–B) is in the range from 27° C. to 45° C.

5. A polyester film according to claim 1 wherein the polyester film has an oligomer concentration of not more than 0.8% by weight of the film.

6. A polyester film according to claim 1 wherein the antioxidant is a hindered phenol.

7. A polyester film according to claim 1 wherein the polyester film comprises 0.05% to 2% of an opacifying inorganic filler having an average particle size in the range from 0.01 to 10 μm.

8. A polyester film according to claim 7 wherein the filler is titanium dioxide.

9. A polyester film according to claim 1 wherein the polyester is a polyethylene terephthalate homopolymer or a polyethylene terephthalate copolymer comprising up to 5 mole % of isophthalate groups.

10. A method of producing an oriented polyester film resistant to delamination comprising a polyester having an intrinsic viscosity (IV) in the range from 0.65 to 0.8, and an effective amount of an antioxidant, the polyester having an endothermic high temperature peak at a temperature of (A)°C. and an endothermic low temperature peak at a temperature of (B)°C., both peaks being measured by differential scanning calorimetry (DSC), wherein the value of (A–B) is in the range from 25° C. to 50° C.

11. A biaxially oriented polyester film resistant to delamination comprising a polyester having an intrinsic viscosity (IV) in the range from 0.65 to 0.8, and an effective amount of an antioxidant, the polyester having an endothermic high temperature peak at a temperature of (A)°C. and an endothermic low temperature peak at a temperature of (B)°C., both peaks being measured by differential scanning calorimetry (DSC), wherein the value of (A–B) is in the range from 25° C. to 50° C., and wherein the polyester film has an oligomer concentration of not more than 0.8% by weight of the film.

* * * * *